United States Patent [19]

Frushour

[11] Patent Number: 5,032,147

[45] Date of Patent: Jul. 16, 1991

[54] HIGH STRENGTH COMPOSITE COMPONENT AND METHOD OF FABRICATION

[76] Inventor: Robert H. Frushour, 2313 Devonshire, Ann Arbor, Mich. 48104

[21] Appl. No.: 153,725

[22] Filed: Feb. 8, 1988

[51] Int. Cl.5 .............................................. B24D 3/02
[52] U.S. Cl. ........................................ 51/309; 51/293; 51/295; 51/308
[58] Field of Search ................. 51/293, 295, 298, 308, 51/309

[56] References Cited

U.S. PATENT DOCUMENTS

| | | | |
|---|---|---|---|
| 4,225,322 | 9/1980 | Knemeyer | 51/295 |
| 4,496,372 | 1/1985 | Almond et al. | 51/309 |
| 4,505,721 | 3/1985 | Almond et al. | 51/309 |
| 4,522,633 | 6/1985 | Dyer | 51/309 |
| 4,670,025 | 6/1987 | Pipkin | 51/295 |
| 4,686,080 | 8/1987 | Hara et al. | 51/309 |
| 4,789,385 | 12/1988 | Dyer et al. | 51/308 |
| 4,802,895 | 2/1989 | Burnand et al. | 51/293 |
| 4,871,377 | 10/1989 | Frushour | 51/309 |

Primary Examiner—William R. Dixon, Jr.
Assistant Examiner—Willie J. Thompson
Attorney, Agent, or Firm—Robert B. Crouch

[57] ABSTRACT

A composite component suitable for high temperature applications which includes a composite compact that is thermally stable at temperatures up to 1200° C., the composite compact including a thin layer of metal bonded directly to a polycrystalline table in a HP/HT press, and a metallic substrate joined to the thin layer of metal by a high strength braze joint. The method of fabrication includes the steps of: placing a high temperature braze filler metal on the upper surface of the substrate and in contact with the thin layer of metal; applying heat through the table to melt the filler metal and accomplish the high strength joint between the substrate and the thin layer of metal; and cooling the substrate by conducting heat from all but the upper surface thereof.

10 Claims, 1 Drawing Sheet

HIGH STRENGTH COMPOSITE COMPONENT AND METHOD OF FABRICATION

CROSS REFERENCE TO RELATED APPLICATIONS

U. S. Patent Application Ser. No. 892,186, filed July 30, 1986, which is a continuation of U. S. Patent Application Ser. No. 690,136, filed Jan. 10, 1985, which is in turn a continuation-in-part of U. S. Patent Application Ser. No. 425,289, filed Sep. 29, 1982, and assigned to the assignee of the invention herein, is directed to a process of manufacturing a composite abrasive compact having high thermal stability, which includes the steps of: sintering a mass of abrasive particles in a high pressure, high temperature (HP/HT) press in the presence of a solvent-catalyst sintering aid, such as cobalt; removing the solvent-catalyst from the resultant compact by leaching; re-sintering the compact in the HP/HT press in the presence of a non-catalyst sintering aid to create a tough binding matrix; and bonding the compact to a metallic substrate in the HP/HT press.

BACKGROUND OF THE INVENTION

The present invention relates to a composite component which includes a thermally stable composite compact joined to a supporting substrate by a high strength braze joint.

Composite compacts manufactured in accordance with U.S. Pat. No. 3,745,623, which comprise a thin table of polycrystalline, cobalt-infiltrated diamond or boron nitride bonded to a thick cemented carbide substrate, are well known in the cutting and drilling arts. Such composite compacts have been widely used in applications having thermal requirements below 700° C. However, difficulty has been experienced in working with such composite compacts at temperatures approaching 700° C., and has been impossible at sustained temperatures above such limit. Cobalt, which is relied upon as a solvent-catalyst in the manufacturing process of converting graphite to diamond, and which is present in the table as the secondary phase, becomes active at approximately 700° C. at atmospheric pressure, and catalyzes the back-conversion of diamond to graphite, thereby causing the table to degrade and lose its capability as an abrasive.

Efforts to adapt composite compacts to use as cutters for rotary drill bits have been hampered by the inherent thermal instability, at temperatures approaching 700° C., of the commercially available cobalt-infiltrated composite compacts. The abrasion resistance and effective life characteristics of such composite compacts have been attractive for such use, but the inability to attach them securely to a drill bit, such that they will be retained in cutting position under the wide range of extremely adverse conditions encountered in drilling hard rock formations, compressive strengths of 20,000 psi and above, has limited their use. For reasons of cost, brazing has been the method of choice for securing a composite compact to a stud or pin to be mounted on a drill crown. However, the strength of a braze joint is directly related to the liquidus of the braze filler metal used, and the high strength braze filler metals have a liquidus greater than the degradation temperature, 700° C., of the polycrystalline table.

A solution to this dilemma was offered by U.S. Pat. No. 4,200,159 in the suggestion of cooling the composite compact while it is soldered at high temperatures, and by U.S. Pat. No. 4,225,322 in the teaching of cooling the polycrystalline table with a heat sink while brazing the thick substrate to a cemented carbide pin or stud with a high liquidus braze filler metal. This technique facilitates production of composite compact cutters for rotary drill bits which utilize the capabilities of the polycrystalline cobalt-infiltrated composite compacts within the limits imposed by the composition of the compacts and by the differential heating of the various parts of the cutters. The use of a solvent-catalyst, such as cobalt, in the prior art composite compacts limits their use to operating temperatures below the degradation temperature of the table. In addition, the thick cemented carbide substrate, approximately six times the thickness of the table, creates a very significant moment arm through which the working forces applied to the polycrystalline table are transmitted to the braze joint, thus substantially multiplying the effect of such forces on the joint. Furthermore, internal stresses are created within the composite compact during manufacture and within the material of the pin or stud during the brazing process due to the elevated temperatures employed and the differential heating of the substrate and the table.

SUMMARY OF THE INVENTION

It is an object of the present invention to provide a polycrystalline diamond or boron nitride composite component which is thermally stable up to 850° C., and preferably, 1200° C.

It is another object to provide an improved method of brazing a thermally stable composite compact to a metallic support or substrate.

It is a further object to provide a composite component in which the internal stresses induced in fabrication are minimized.

It is an additional object to provide a method of brazing a polycrystalline diamond or boron nitride composite component using a braze filler metal which has a liquidus above 1200° C., and below the degradation temperature of the polycrystalline table.

These and other objects of the invention are realized by a polycrystalline composite component for cutting or drilling which is thermally stable up to 850° C., and preferably 1200° C., and which includes a table of diamond or boron nitride particles bonded in particle-to-particle contact with a strong binder matrix of non-catalyst metals and metallic compounds, such as silicon or boron or alloys/mixtures thereof with iron, nickel, cobalt or other Group VIII metals, dispersed therethrough, a thin layer of metal which has a melting point above 1000° C., bonded directly to the table in a HP/HT press, and a thick metallic substrate brazed to the thin layer with a high strength braze filler metal having a liquidus above 700° C., and below the degradation temperature of the table, and a method of fabrication thereof. The method comprises the steps of: placing a high temperature braze filler metal on the upper surface of a metallic substrate; positioning the thin metal layer of the thermally stable composite compact in contact with the braze filler metal; positioning a heat receptor in contact with the polycrystalline table of the composite compact; applying heat to the receptor to heat the thin metal layer, the filler metal, and the upper surface of the substrate to form a high strength braze joint between the thin metal layer and the substrate; and cooling the substrate by conducting heat from all but the upper surface thereof.

All references cited are expressly incorporated by reference.

DETAILED DESCRIPTION OF THE INVENTION

Figure 1:
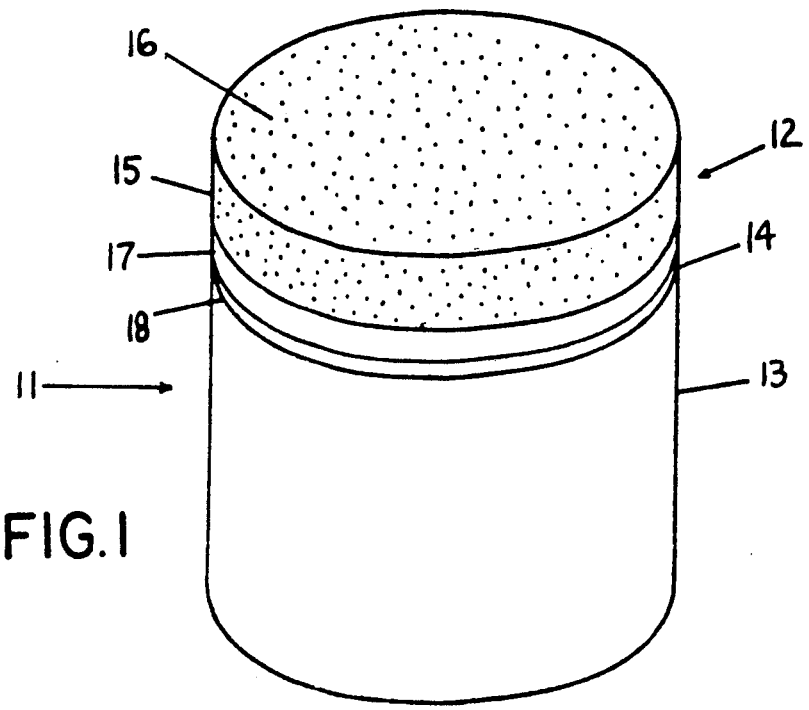
FIG. 1 is a perspective view, at an enlarged scale, of a high temperature composite component.

Referring to the drawing, a composite component 11 is illustrated as comprising a thermally stable composite compact 12 which is joined to a thick supporting substrate 13 by means of a high strength braze joint 14 (shown at an enlarged scale for purposes of illustration). The substrate 13 is shown as an elongated cylindrical pin, but it is understood that it may be a stud, a tool holder, a thick disc, or other specialized shape depending upon the application or use for which it is intended.

Composite compact 12 includes a polycrystalline table 15 of well sintered diamond or boron nitride particles bonded in particle-to-particle contact, a strong chemically-inert binder matrix 16 of silicon or boron or alloys/mixtures thereof with nickel, iron, cobalt or other Group VIII metals, and a thin layer of metal 17 having a melting point above 1000° C., bonded directly to the polycrystalline table in a HP/HT press. The thickness of the thin metal layer is selected such that at temperatures of 850° C., to 1200° C., the differential forces due to thermal expansion do not exceed the fracture strength of the table. This will be influenced by the composition of the metal layer, but a layer of tungsten carbide 5 mils thick has been satisfactory. The metal, which must provide a smooth surface suitable for brazing, is selected from the group of tungsten, tungsten carbide, tantalum, titanium and Group VIII metals. The use of noncatalyst solvents, such as silicon, boron and their alloys/mixtures, as the binder matrix, or secondary phase, produces an abrasive compact which is thermally stable at temperatures up to 850° C., and preferable 1200° C. Such compacts can be produced in accordance with the teachings of co-pending U.S. Patent Application Ser. No. 151,942, filed Feb. 3, 1988; now U.S. Pat. No. 4,871,377.

The substrate 13 is preferably made of cemented tungsten carbide because its hardness and impact-resistance characteristics make it suitable for a wide range of uses. However, it is contemplated that the substrate may be made of steel or other metal alloy or compound which exhibits characteristics required by a particular application.

A suitable braze filler metal 18 has a high liquidus and produces a correspondingly high strength braze joint. The braze filler metal is selected for compatibility with the metals being brazed and for the strength of the filler metal and the degradation temperature of the polycrystalline table Since the binder matrix 16 of the polycrystalline table 15, is made up of metals, alloys and/or compounds which are non-catalyst, they do not become active when heated and they, therefore, do not catalyze the back-conversion of diamond to graphite at elevated temperatures. Even at temperatures which approach the melting point of a particular binder matrix composition the particle-to-particle bonding of the polycrystalline table is not significantly degraded. For example, a commercially available braze filler metal, identified as Cocuman and having a liquidus of 999° C., has been used to join the thermally stable composite compact 12 to a tungsten carbide substrate with a high strength joint without any measurable adverse effect on the abrasion resistance of the polycrystalline table. In this regard, while braze filler metals are particularly appropriate, due to time and equipment factors, it is understood that the filler metal 18 may be a metal or alloy used in bonding techniques such as diffusion bonding, hot pressing, resistance welding and the like.

Figure 2:
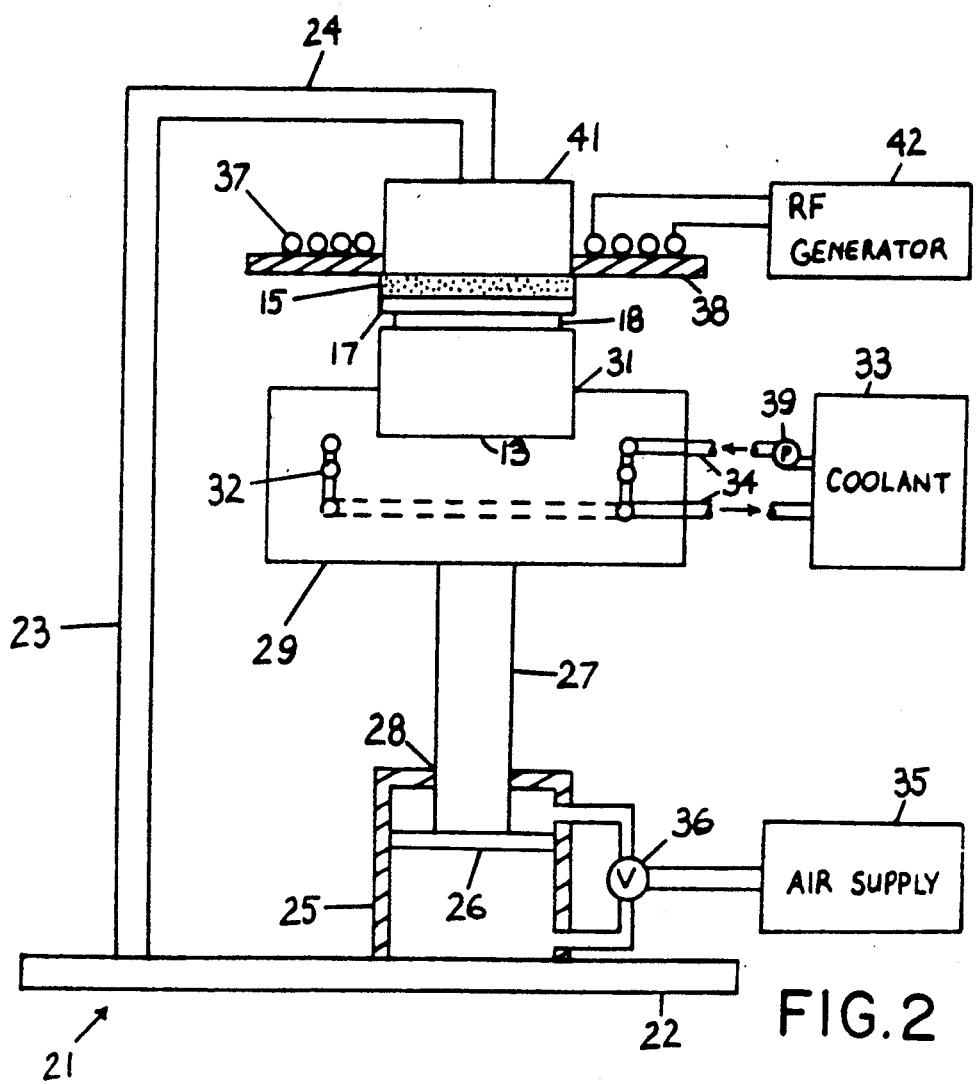
FIG. 2 is a schematic diagram, partly in section, of an apparatus for fabricating a high temperature composite component according to the method of the present invention.

Apparatus for fabricating the composite component 11 is illustrated in diagrammatic form in FIG. 2 as having a frame 21 which includes a base 22, a vertical support 23 and a laterally extending arm 24. A pneumatic cylinder 25 is mounted on the upper surface of the base 22 with a piston 26 positioned within the cylinder and secured to one end of a rod 27 which extends through an opening 28 in the end of the cylinder removed from the base. A pressurized air supply 35 is connected through a valve 36 to the interior of the cylinder 25 on opposite sides of the piston 26. A fixture 29 is mounted on the opposite end of the rod 07 and is provided with a central recess 31 which is dimensioned to receive a substrate 13. The interior of the fixture is cored, as at 32, and is connected to a supply of coolant liquid, preferably water, through flexible leads, or hoses, 34 and a pump 39. A heat receptor of graphite or refractory metal, having a melting point above 1600° C., is mounted on the arm 24 and extends toward the fixture 29. An induction heating coil which includes a flat coil to a suitable power source, such as an R F generator 42. A transparent hood (not shown) may be suspended from arm 24 to encircle receptor 41 and create an inert-gas atmosphere, if desired.

In the operation of the apparatus of FIG. 2, the pump 39 is activated to circulate coolant through the fixture. The rod 27 and the fixture 29 are then retracted to the loading/unloading position by switching valve 36 to apply air pressure to the upper surface of the piston 26. In this position of the fixture, a substrate 13 is positioned within the recess 31. A layer of braze filler metal 18 is positioned on the upper surface of the substrate and a thermally stable composite compact is placed above the filler metal with the thin layer of metal 17 in contact therewith. The valve 36 is then switched to apply air pressure to the lower surface of the piston 26 to extend rod 27 and elevate fixture 29 until the polycrystalline table 15 is seated firmly against the lower surface of the receptor 41. The R F generator is then activated to apply power to the induction heater and, through the coil 37 and the intensifier plate 38, heat the receptor and apply heat directly to the table 15. Heat is transmitted through the table and thin metal layer to melt the braze filler metal and accomplish the braze joint between the thin metal layer and the substrate. While the temperature of the composite compact and the filler metal are being raised, the temperature of the substrate is limited by the circulation of coolant through the fixture. By cooling the substrate during the brazing process, thermally-induced stresses within the substrate are minimized and degradation of the strength characteristics of the substrate inhibited.

Since the composite compact 12 is thermally stable at elevated temperatures, due to the non-catalytic nature of the binder matrix and the fact that the coefficient of thermal expansion of the matrix closely approximates that of the polycrystalline table, the degradation temperature of the table is effectively eliminated as a limiting factor in working with the compact. The limiting factor becomes the melting temperature of the metals being brazed, i.e., the thin metal layer and the substrate. Since the melting point of tungsten carbide, for instance, is approximately 1430° C., at atmospheric pressure, this provides a wide range of choice in selection of a high temperature braze filler metal for making the braze joint. In this regard, G.T.E.-Wesco braze filler metals identified as Cocuman, R I 46, and Palnicro, all have melting points of approximately 1000° C., and would be satisfactory for most uses.

It is desirable to complete the braze joint as rapidly as possible to avoid sustained heating of the composite compact or substrate. This is facilitated if the surfaces being joined are smooth and without irregularities, to allow the braze filler metal to flow freely and cover both surfaces completely. More important is the application of a surge of power to the induction heater for the minimum period of time necessary to generate the required temperatures in the surfaces being joined. This is largely a function of the power output of the generator and the number of turns in the coil. With a braze filler metal of approximately 1000° C., liquidus, an effective high-strength joint (80,000 psi) has been produced in 15-20 seconds, with a power output of 10 KW from the generator and four turns on the coil.

While the invention has been described with reference to specifically illustrated preferred embodiments, it should be realized that various changes may be made without departing from the disclosed inventive subject matter particularly pointed out and claimed herebelow.

I claim:

1. A composite component for cutting applications involving sustained temperatures of up to at least 850° C., comprising
    a relatively thick table of well sintered abrasive particles bonded in particle-to-particle contact with interstices between adjacent particles, a strong chemically inert binder matrix disposed throughout the table in the interstices,
    a relatively thin layer of metal having a melting point above 1000° C. bonded directly to the table in a HP/HT press, and
    a thick metallic substrate brazed to the thin layer of metal with a high strength braze joint which includes a braze filler metal having a liquidus above 700° C., and below the degradation temperature of the table.

2. A composite component as set forth in claim 1 wherein the table is at least twice the thickness of the thin layer of metal.

3. A composite component as set forth in claim 2 wherein the table is at least 10 mils thick and the thin layer of metal is no more than 5 mils thick.

4. A composite component as set forth in claim 2 wherein the thin layer of metal is chosen from the group consisting of tungsten, tungsten carbide, tantalum, titanium and Group VIII metals.

5. A composite component as set forth in claim 1 wherein the abrasive particles are diamond, and
    the binder matrix is chosen from the group consisting of silicon, boron, alloys/mixtures thereof with nickel, iron, cobalt or other Group VIII.

6. A method of fabricating a composite component which includes a polycrystalline table that is thermally stable up to at least 850° C., made up of well sintered abrasive particles bonded in particle-to-particle contact with interstices between adjacent particles and a strong chemically inert binder matrix dispersed throughout the table in the interstices,
    a thin layer of metal having a melting point above 1000° C., bonded directly to the table in a HP/HT press, and
    a thick metallic substrate joined to the thin layer of metal by a high strength braze joint that includes a high temperature braze filler metal, which method comprises
    applying heat through the table to the thin metal layer and high temperature braze filler metal and the upper surface of the substrate, and
    cooling the substrate by conducting heat from all but the upper surface thereof.

7. A method as defined in claim 6 which uses a braze filler metal having a liquidus which is above 700° C., and below the degradation temperature of the table.

8. A method of fabricating a composite component which includes a polycrystalline table that is thermally stable 1200° C. made up of well sintered abrasive particles bonded in particle-to-particle contact with interstices between adjacent particles,
    a strong chemically-inert binder matrix dispersed throughout the table in the interstices,
    a thin layer of metal having a melting point above 1000° C., bonded directly to the table in a HP/HT press, and
    a thick metallic substrate joined to the thin metal layer by a high strength braze joint, which method comprises
    positioning a high temperature braze filler metal on the upper surface of the substrate and in contact with the thin layer of metal,
    applying heat directly to the table to melt the filler metal and complete the braze joint between the thin layer of metal and the substrate, and
    cooling the substrate by conducting heat from all but the upper surface thereof.

9. A method as defined in claim 8 wherein the braze filler metal has a liquidus above 700° C. and below the degradation temperature of the table.

10. A method as set forth in claim 9 wherein heat is applied to a receptor which is in direct contact with the table, and
    cooling is accomplished by circulation of liquid coolant through a fixture which supports the component during brazing.

* * * * *